United States Patent [19]

Fukamachi

[11] Patent Number: 4,741,508
[45] Date of Patent: May 3, 1988

[54] ACTUATOR FOR VALVE

[76] Inventor: Rikuo Fukamachi, 1-44-10, Tezukayama, Nara City, Japan

[21] Appl. No.: 49,344

[22] Filed: Apr. 13, 1987

[51] Int. Cl.$^4$ .......................................... F16K 31/04
[52] U.S. Cl. ...................................... 251/71; 251/69; 251/129.12; 185/40 R
[58] Field of Search ...................... 137/38; 185/40 R; 251/69, 71, 129.11, 129.12

[56] References Cited

U.S. PATENT DOCUMENTS

| | | | |
|---|---|---|---|
| Re. 30,135 | 11/1979 | Fitzwater | 251/71 X |
| 3,279,744 | 10/1966 | Fieldsen | 251/71 X |
| 4,595,081 | 6/1986 | Parsons | 251/129.11 X |
| 4,621,789 | 11/1986 | Fukamachi | 251/129.11 |
| 4,669,578 | 6/1987 | Fukamachi | 251/71 X |

*Primary Examiner*—Robert G. Nilson
*Attorney, Agent, or Firm*—Wenderoth, Lind & Ponack

[57] ABSTRACT

An actuator for a valve has an output shaft adapted to be connected directly to a rotary shaft of the body of a valve, the shaft being pivotally supported in a casing, a gear rotated in one direction only by a motor, an internal gear having outer peripheral teeth meshed with the first-mentioned gear, the internal gear being rotatable independently from the output shaft and pivotally supported thereby, a further gear meshed with the inner peripheral teeth of the internal gear and with a still further gear secured to the output shaft, a yet further gear for pivotally supporting the further gear at a shaft, the yet further gear being pivotally supported by the output shaft such that it is rotatable independently therefrom, a power spring to be wound by the rotation of the output shaft in the valve opening direction, and an electromagnetic device for preventing the yet further gear from being rotated while power is supplied, and permitting it to be rotated when power is shut off.

1 Claim, 4 Drawing Sheets

4,741,508

ACTUATOR FOR VALVE

BACKGROUND OF THE INVENTION

Valves are generally disposed in the course of passages of gas or a liquid for adjusting the flow rate thereof or controlling the opening and closing of the passages. There are instances where a disaster such as an earthquake or a fire may provoke an unforseen severe accident due to leak of combustible gas unless the gas passages are immediately closed. In such case, it is required to emergently close the valves simultaneously with the occurrence of a disaster. However, it is not actually possible to manually operate a plurality of valves simultaneously, specially in a state of disorder at the time of the occurrence of a disaster. Some measures to be taken have therefore been required.

In this connection, there has been proposed an actuator adapted to automatically close a valve by switching an electromagnetic clutch, using the retaining strength of a power spring which has been manually wound in advance. In such actuator, the power spring has to be manually wound in advance, taking much labor, and there is a risk of failure to wind the power spring. Further, the use of expensive electromagnetic clutch disadvantageously increases the manufacturing cost. In view of the foregoing, such actuator has not been put to practical use until now.

SUMMARY OF THE INVENTION

It is a first object of the invention to provide an actuator which overcomes these defects of the conventional actuator and which can be easily operated requiring no manual operation.

It is a second object of the invention to provide an actuator which can automatically close a valve with the use of the retaining strength of a power spring without a clutch operation, if power is shut off at the time of power failure or the like.

It is a third object of the invention to provide an actuator in which the driving force of a motor for rotating the body of a valve in the opening direction is utilized for winding a power spring.

It is a fourth object of the invention to provide an actuator adapted to close a valve by unwinding a power spring by the operation of an electromagnetic device such as an electromagnetic brake, if power is shut off at the time of power failure or the like, thus preventing an unforseen accident from happening.

The present invention is proposed in order to achieve these objects. The concrete arrangement of the invention will be understood from the following detailed description with reference to the attached drawings.

DETAILED DESCRIPTION OF THE PREFERRED EMBODIMENT

Figure 1:
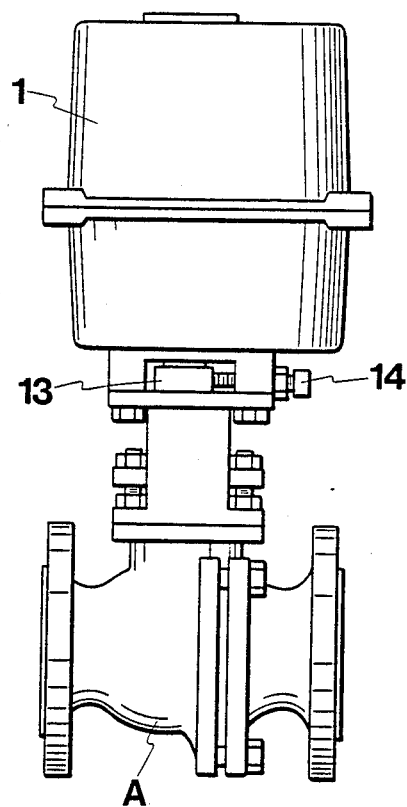
FIG. 1 is a side view of an actuator in accordance with the present invention mounted on a valve.
Figure 2:
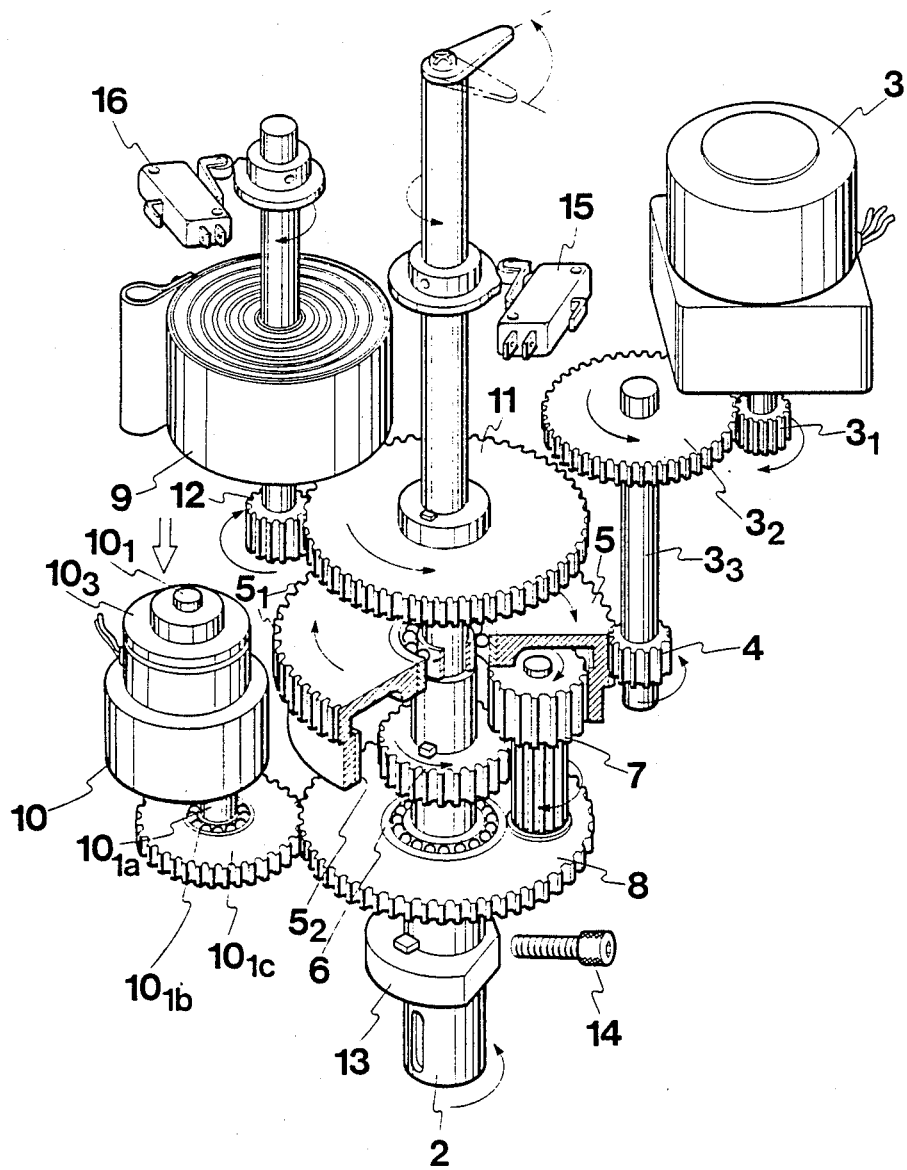
FIG. 2 is a perspective view of the actuator in FIG. 1 with the valve closed.
Figure 3:
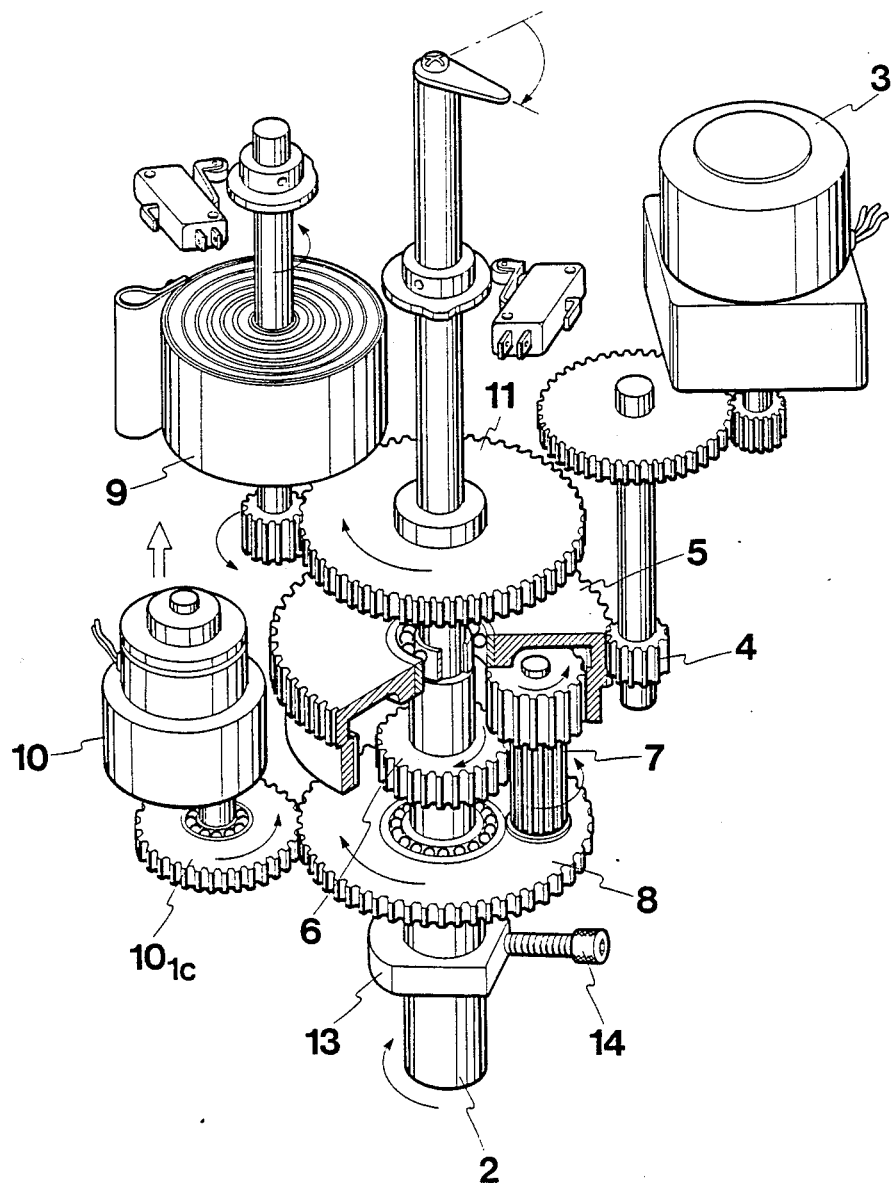
FIG. 3 is a perspective view of the actuator in FIG. 1 with the valve opened.
Figure 4:
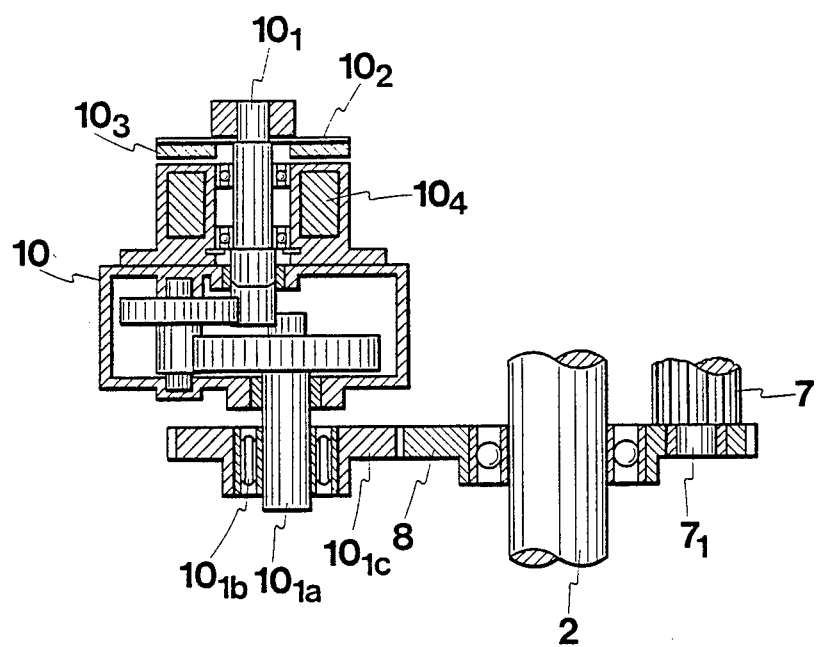
FIG. 4 is a longitudinal side view of an electromagnetic device.

The present invention comprises a casing 1, an output shaft 2 to be connected directly to a rotary shaft of the body of a valve A, the shaft 2 being pivotally supported in the casing 1, a gear 4 to be rotated in one direction only by a motor 3, an internal gear 5 having outer peripheral teeth $5_1$ meshed with the gear 4, the internal gear 5 being pivotally supported by the output shaft 2 and rotatable independently therefrom, a gear 7 meshed with inner peripheral teeth $5_2$ of the internal gear 5 and with a gear 6 secured to the output shaft 2, and gear 8 for pivotally supporting the gear 7 at a shaft $7_1$, the gear 8 being pivotally supported by the output shaft 2 such that the gear 8 is rotatable independently therefrom, a power spring 9 wound by the rotation of the output shaft 2 in the valve opening direction, and an electromagnetic device 10 for preventing the gear 8 from being rotated while power is supplied, and for permitting the gear 8 to be rotated when the power is shut OFF.

The motor 3 is arranged such that the rotary shaft is fixed by an internal brake mechanism while the motor is stopped operating, and such that the rotating force of the motor is transmitted to the gear 4 through reduction gears $3_1$ and $3_2$ and a shaft $3_3$. The gear 7 includes a larger diameter portion meshed with the inner peripheral teeth $5_2$ of the internal gear 5, and a smaller diameter portion meshed with the gear 6. The power spring 9 has an inner end secured to a shaft $12_1$ integral with a gear 12 meshed with a gear 11 secured to the output shaft 2, and an outer end suitably secured to the casing 1. The power spring 9 is adapted to be wound by the rotation of the output shaft 2 in the valve opening direction. The electromagnetic device 10 includes a rotary shaft $10_1$, a thin plate $10_2$ secured to the upper end of this rotary shaft, a ring-shape absorbing plate $10_3$ secured to this thin plate $10_2$, and an electromagnet $10_4$ for magnetically absorbing the absorbing plate $10_3$. By the excitation of the electromagnet $10_4$, the abosorbing plate $10_3$ is magnetically absorbed to the electromagnet $10_4$ to prevent the rotary shaft $10_1$ from being rotated. Together with a reduction gear, the electromagnetic device 10 is housed in the casing 1. A gear $10_{1c}$ is mounted on a rotary shaft $10_{1a}$ through a one-way clutch $10_{1b}$, the rotary shaft $10_{1a}$ being connected to the rotary shaft $10_1$ through a reduction gear. The gear $10_{1c}$ is meshed with the gear 8.

A rotation restricting cam 13 is secured to a portion of the output shaft 2 adjacent the lower end thereof. This cam 13 is arranged so as to be rotated forwardly and reversely within an angle of 90° by a stopper 14 facing to the inside from the outside of the lower end of the casing 1.

A limit switch 15 is adapted to be turned OFF when the contact thereof is opened by a cam secured to the output shaft 2 when the output shaft 2 is rotated up to the valve opening position. The limit switch 15 is disposed for controlling the supply of power to the motor 3. A limit switch 16 is adapted to be turned ON when the contact is closed by a cam secured to the shaft $12_1$ for winding the power spring 9 when the shaft $12_1$ is rotated up to a position where the power spring 9 is sufficiently wound. The limit switch 16 is disposed for making sure that the spring 9 is sufficiently wound.

The following description will discuss how to use and operate the actuator in accordance with the present invention shown in the embodiment above-mentioned.

With the lower end of the output shaft 2 fitted in a fitting hole haviing a key groove in the upper end of the rotary shaft of the body of the valve A, the actuator in accordance with the present invention is attached to the valve A such that the rotary shaft of the valve and the output shaft 2 are integrally rotated.

When the main switch of a power supply if turned ON to supply power to the motor 3 with the body of the valve closed, the motor 3 is driven to rotate the gear 4. The internal gear 5 of which the outer peripheral teeth $5_1$ are meshed with the gear 4, is then rotated in the direction shown by an arrow. The gear 7 meshed with the inner peripheral teeth $5_2$ is also rotated. When the main switch is turned ON, power is also supplied to the electromagnet $10_4$ of the electromagnetic device 10. The excitation of the electromagnet $10_4$ prevents the gear 8 which pivotally supports the gear 7 at the shaft $7_1$, from being rotated. Therefore, the gear 7 is rotated as it is. The gear 6 meshed with the smaller diameter portion of the gear 7 and the output shaft 2 integral with the gear 6 are rotated in the valve opening direction. At this time, when the power spring 9 is wound and the output shaft 2 is rotated up to a position where the valve body is fully opened, power to the motor 3 is shut off by the operation of the limit 15. The motor 3 is then stopped operating and the rotary shaft is fixed by the internal brake mechanism to prevent the internal gear 5 from being rotated. Therefore, the output shaft 2 cannot be reversely rotated even though the output shaft 2 tends to be reversely rotated by the retaining strength of the power spring 9, and the power spring 9 is held as pressure-accumulated.

When the main switch is turned OFF or power to the electromagnet $10_4$ of the electromagnetic device 10 is shut off due to power failure, the absorbing plate $10_3$ magnetically absorbed by the electromagnet $10_4$ is separated therefrom. Therefore, the rotary shaft $10_{1a}$ and the gear $10_{1c}$ become free and the gear 8 becomes rotatable. Therefore, the gear 7 meshed with the gear 6 is meshed with the inner peripheral teeth $5_2$ of the internal gear 5, thus permitting the gear 7 to perform a so-called planetary motion, i.e. turning together with the gear 8 while turning on its axis. The output shaft 2 is rotated in the direction shown by a dotted line or in the valve A closing direction by the retaining strength of the power spring 9, so that the valve is closed. At this time, the absorbing plate $10_3$ integral with the rotary shaft $10_1$ is rotated at a high speed. However, when the output shaft 2 is rotated by 90° and the cam 13 comes in contact with the stopper 14 to suddenly stop the rotation of the absorbing plate $10_3$, an unreasonable force is applied to the reduction gear by the force of inertia of the absorbing plate $10_3$. There is a risk of the reduction gear being damaged. However, the one-way clutch $10_{1b}$ is disposed between the rotary shaft $10_{1a}$ and the gear $10_{1c}$. Even though the gear 8 is stopped rotating in the course of rotation to stop the gear $10_{1c}$, the rotary shaft $10_{1a}$ or the rotary shaft $10_1$ and the absorbing plate $10_3$ are run idle by the force of inertia under the action of this one-way clutch $10_{1b}$. No force is therefore applied to the reduction gear.

Thereafter, the operations above-mentioned are repeated for each opening/closing of the valve.

According to the actuator for a valve in accordance with the present invention as discussed hereinbefore, the valve is automatically closed when the main switch is turned OFF or the electricity is cut off while the valve body is opened. Therefore, if a disaster such as an earthquake, a fire or the like happens, the valve body is instantaneously closed to prevent a secondary accident from happening. When the actuators of the present invention are respectively attached to a plurality of valves, the opening/closing of the valves can be controlled at one place. Not only in case of emergency of a disaster, but also in a general use, the opening/closing of valves can be easily controlled. Thus, the present invention represents very practical advantages.

What is claimed is:

1. Actuator for valve comprising:

a casing (1);

an output shaft (2) adapted to be connected directly to a rotary shaft of the body of a valve (A), said shaft (2) being pivotally supported in said casing (1);

a gear (4) rotated in one direction only by a motor (3);

an internal gear (5) having outer peripheral teeth ($5_1$) meshed with said gear (4), said gear (5) being rotatable independently from said output shaft (2) and pivotally supported thereby;

a gear (7) meshed with inner peripheral teeth ($5_2$) of said internal gear (5) and with a gear (6) secured to said output shaft (2);

a gear (8) for pivotally supporting said gear (7) at a shaft ($7_1$), said gear (8) being pivotally supported by said output shaft (2) such that said gear (8) is rotatable independently therefrom;

a power spring (9) to be wound by the rotation of said output shaft (2) in the valve opening direction; and an electromagnetic device (10) for preventing said gear (8) from being rotated while power is supplied, and permitting said gear (8) to be rotated when power is shut off.

* * * * *